(12) United States Patent
Shoji

(10) Patent No.: US 11,040,706 B2
(45) Date of Patent: Jun. 22, 2021

(54) TURNING BEHAVIOR CONTROL APPARATUS FOR A VEHICLE

(71) Applicant: Toyota Jidosha Kabushiki Kaisha, Toyota (JP)

(72) Inventor: Takuya Shoji, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 122 days.

(21) Appl. No.: 16/580,679

(22) Filed: Sep. 24, 2019

(65) Prior Publication Data

US 2020/0094797 A1 Mar. 26, 2020

(30) Foreign Application Priority Data

Sep. 25, 2018 (JP) .............................. JP2018-179179

(51) Int. Cl.
| | |
|---|---|
| *B60T 8/1755* | (2006.01) |
| *B60T 8/24* | (2006.01) |
| *B60W 30/045* | (2012.01) |
| *B60W 40/114* | (2012.01) |
| *B60W 40/076* | (2012.01) |
| *B60W 40/072* | (2012.01) |

(52) U.S. Cl.
CPC ............ *B60T 8/1755* (2013.01); *B60T 8/241* (2013.01); *B60W 30/045* (2013.01); *B60W 40/072* (2013.01); *B60W 40/076* (2013.01); *B60W 40/114* (2013.01)

(58) Field of Classification Search
CPC .......... B60T 8/172; B60T 8/241; B60T 8/246; B60T 8/1755; B60T 2201/16; B60T 2230/02; B60T 8/24; B60W 30/045; B60W 40/072; B60W 40/076; B60W 40/114
USPC ................................. 303/146, 139, 145, 151
See application file for complete search history.

(56) References Cited

U.S. PATENT DOCUMENTS

| | | | |
|---|---|---|---|
| 2005/0012390 A1* | 1/2005 | Kato ...................... | B60T 8/4872 303/146 |
| 2005/0012391 A1* | 1/2005 | Kato ...................... | B60T 8/1755 303/155 |
| 2010/0056338 A1 | 3/2010 | Erban | |
| 2013/0006476 A1* | 1/2013 | Yamazaki ............. | B60W 10/18 701/42 |
| 2017/0166203 A1* | 6/2017 | Sugai ................... | B60K 7/0007 |

FOREIGN PATENT DOCUMENTS

| | | |
|---|---|---|
| JP | 4886848 B2 | 2/2012 |
| JP | 2015-151048 A | 8/2015 |
| JP | 5833872 B2 | 12/2015 |

\* cited by examiner

*Primary Examiner* — Robert A. Siconolfi
*Assistant Examiner* — San M Aung
(74) *Attorney, Agent, or Firm* — Dinsmore & Shohl LLP

(57) ABSTRACT

A turning behavior control apparatus that is applied to a vehicle includes front wheel suspensions and rear wheel suspensions having anti-dive and anti-lift geometries, respectively, and left and right front wheels are steered wheels. The turning behavior control apparatus includes a control unit for controlling the braking device, and the control unit is configured to control the braking device to apply a braking force to a turning inner driving wheel when a deviation between a standard yaw rate of the vehicle and an actual yaw rate exceeds a deviation reference value and a time change rate of the deviation exceeds a start reference value in a situation where the vehicle is turning without braking.

4 Claims, 8 Drawing Sheets

TURNING BEHAVIOR CONTROL APPARATUS FOR A VEHICLE

CROSS-REFERENCE TO RELATED APPLICATION

This application claims priority to Japanese Patent Application No. JP2018-179179 filed on Sep. 25, 2018, the content of which is hereby incorporated by reference in its entirety into this application.

BACKGROUND

1. Technical Field

The present disclosure relates to a turning behavior control apparatus for a vehicle such as an automobile.

2. Description of the Related Art

As a control apparatus for a vehicle such as an automobile, a trajectory control apparatus configured to automatically control a steered angle of steered wheels such that the vehicle travels along a target trajectory is known in the art. For example, in Japanese Patent Application Laid-open No. 2015-151048, a trajectory control apparatus is described which is configured to perform trajectory control to set a target trajectory of a vehicle based on information of a traveling path ahead of the vehicle, determine a target steered angle of steered wheels for causing the vehicle to travel along the target trajectory, and control a steered angle of the steered wheels such that it becomes the target steered angle.

In the trajectory control, when a deviation between the target trajectory of the vehicle and an actual trajectory of the vehicle becomes large, the steered wheels are steered to correct the steered angle of the steered wheels. For example, when a turning radius of the actual trajectory of the vehicle is larger than a turning radius of the target trajectory of the vehicle and a difference between them becomes large, that is, when the vehicle is in understeer state, the steered wheels are steered in a turn-increasing direction to correct the steered angle of the steered wheels in the turn-increasing direction.

However, for example, in a situation where the steered wheels are front driving wheels and a ground contact load of a turning inner front wheel is reduced due to a load movement in the lateral direction of the vehicle, even if the turning inner front wheel is steered in the turn-increasing direction, a lateral force of the wheel does not increase enough. Therefore, a necessary yaw moment cannot be applied to the vehicle, and an actual trajectory of the vehicle cannot be effectively brought close to the target trajectory of the vehicle.

By the way, in a vehicle such as an automobile, a front wheel suspension and a rear wheel suspension have an anti-dive and an anti-lift geometry, respectively so as to reduce a change in pitch attitude of the vehicle at the time of deceleration by braking. Therefore, when a braking/driving force is applied to a wheel, a force in the vertical direction is applied to a vehicle body from the wheel. As will be described in detail later, when a braking force is applied to a turning inner front wheel or a turning inner rear wheel, a load movement from the turning outer front wheel to the turning inner front wheel occurs, and a ground contact load of the turning inner front wheel increases. Accordingly, by applying a braking force to the turning inner front wheel or the turning inner rear wheel, a lateral force generated by the turning inner front wheel being steered in the turn-increasing direction is increased, and a turning yaw moment necessary for the vehicle can be applied to the vehicle and the degree of deterioration of understeer state can be reduced.

SUMMARY

The present disclosure provides a turning behavior control apparatus which is improved to reduce the degree of deterioration of understeer state by increasing a lateral force of a turning inner front wheel in a situation where a vehicle turns without braking and understeer state of the vehicle is deteriorated.

According to the present disclosure, a turning behavior control apparatus for a vehicle that is applied to a vehicle which comprises front wheel suspensions and rear wheel suspensions having anti-dive and anti-lift geometries, respectively, and a braking device configured to independently apply braking forces to left and right front wheels and left and right rear wheels, and the left and right front wheels are steered wheels.

The turning behavior control apparatus comprises a control unit for controlling the braking device, and the control unit is configured to control the braking device to apply a braking force to a turning inner driving wheel when a deviation between a standard yaw rate of the vehicle and an actual yaw rate exceeds a deviation reference value and a time change rate of the deviation exceeds a start reference value in a situation where the vehicle is turning without braking.

According to the above configuration, a braking force is applied to a turning inner driving wheel when a deviation between a standard yaw rate of the vehicle and an actual yaw rate exceeds a deviation reference value and a time change rate of the deviation exceeds a start reference value in a situation where the vehicle is turning without braking. Therefore, a load movement from the turning outer front wheel to the turning inner front wheel occurs, and a ground contact load of the turning inner front wheel increases. Accordingly, a lateral force generated by the turning inner front wheel increases, and a turning yaw moment applied to the vehicle increases, so that the degree of deterioration of understeer state and the degree of understeer state can be reduced.

It should be noted that when a braking force is constantly applied to a turning inner driving wheel in a situation where a vehicle is in understeer state, a lateral force of the wheel is reduced contrary to the expectations and the turning stability of the vehicle is lowered. According to the above configuration, an application of a braking force to the turning inner driving wheel is limited when a yaw rate deviation of the vehicle exceeds the deviation reference value and a time change rate of the deviation exceeds the start reference value. Therefore, the turning stability of the vehicle can be prevented from being lowered due to a braking force being constantly applied to the turning inner drive wheel and a lateral force of the wheel being reduced.

Further, in a situation where a braking force is applied to a turning inner driving wheel, if the braking force of the turning inner driving wheel is increased, a lateral force of the wheel is reduced and the turning stability of the vehicle is lowered. According to the above configuration, the application of a braking force to the turning inner driving wheel is limited to a situation where the vehicle is turning without braking, that is, a situation where the vehicle turns without a braking force being applied to the turning inner driving wheel. Therefore, a lateral force of the wheel can be prevented from being reduced due to an increase of the braking force of the turning inner driving wheel to which the braking force is applied, and the turning stability of the vehicle can be prevented from being decreased.

Notably, the turning inner driving wheel is a turning inner rear wheel when the vehicle is a rear wheel drive vehicle, is a turning inner front wheel when the vehicle is a front wheel drive vehicle, and is at least one of the turning inner front wheel and the turning inner rear wheel when the vehicle is a four-wheel drive vehicle.

In one aspect of the present disclosure, the control unit is configured to calculate a target value of the braking force to be applied to the turning inner driving wheel based on at least the time change rate of the deviation so as to increase as the time change rate of the deviation increases and control the braking device such that a braking force applied to the turning inner driving wheel becomes the target value.

According to the above aspect, a target value of the braking force to be applied to the turning inner driving wheel is calculated based on at least the time change rate of the deviation so as to increase as the time change rate of the deviation increases, and the braking device is controlled such that a braking force applied to the turning inner driving wheel becomes the target value.

In another aspect of the present disclosure, the control unit is configured to correct a magnitude of the target value to be equal to or less than twice a driving force of the turning inner driving wheel when the magnitude of the target value exceeds twice the driving force of the turning inner driving wheel.

According to the above aspect, a magnitude of the target value is corrected to be equal to or less than twice a driving force of the turning inner driving wheel when the magnitude of the target value exceeds twice the driving force of the turning inner driving wheel. Therefore, when the target value is larger than twice the driving force of the turning inner driving wheel, a braking force based on the excessive target value can be prevented from being applied to the turning inner driving wheel. Accordingly, the turning behavior of the vehicle can be prevented from being further deteriorated due to an increase in the longitudinal force of the turning inner driving wheel and the decrease in the lateral force.

Further, in another aspect of the present disclosure, the control unit is configured to end the application of the braking force to the turning inner driving wheel when the time change rate of the deviation becomes less than an end reference value even if the deviation exceeds the deviation reference value.

According to the above aspect, the application of the braking force to the turning inner driving wheel is ended when the time change rate of the deviation becomes less than the end reference value even if the deviation exceeds the deviation reference value. Therefore, it is possible to effectively prevent a braking force from being applied to the turning inner driving wheel for an excessively long time and the turning behavior of the vehicle from being deteriorated due to such an application of a braking force to the turning inner driving wheel.

Other objects, other features and attendant advantages of the present disclosure will be readily understood from the description of the embodiments of the present disclosure described with reference to the following drawings.

DETAILED DESCRIPTION

[Principle of the Present Disclosure Adopted in Embodiments]

Prior to describing embodiments, the principle of the turning behavior control in the present disclosure will be described with reference to FIGS. 8 to 11 so as to facilitate understanding of the present disclosure.

<Balance of Roll Moment>

Figure 8:
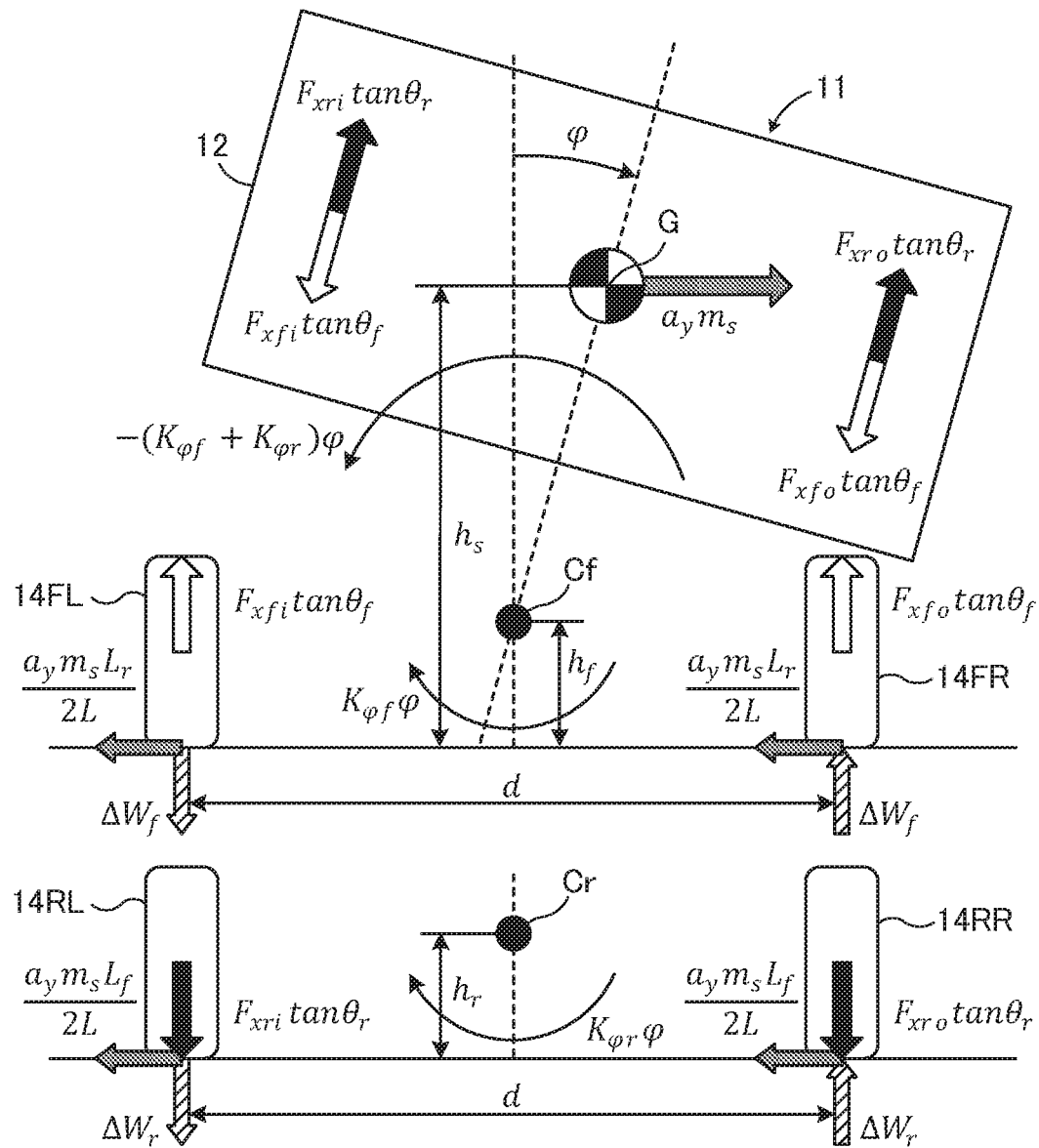
FIG. 8 is an explanatory view of a rolling condition of a vehicle body as viewed from the rear of a vehicle.

In FIG. 8, a vehicle 11 has a vehicle body 12, a front left wheel 14FL, a front right wheel 14FR, a rear left wheel 14RL and a rear right wheel 14RR, and a distance between the left and right wheels, that is, a tread is d. A height of a center of gravity G of the vehicle 11 is $h_s$, and a mass of the vehicle body 12 (sprung mass) is $m_s$. Heights of roll centers Cf and Cr of the vehicle body 12 at the front-rear positions of the front wheels and rear wheels are $h_f$ and $h_r$, respectively, and roll stiffness of the vehicle body at the front-rear positions of the front wheels and rear wheels is $K_{\varphi f}$ and $K_{100 r}$, respectively.

Figure 9:
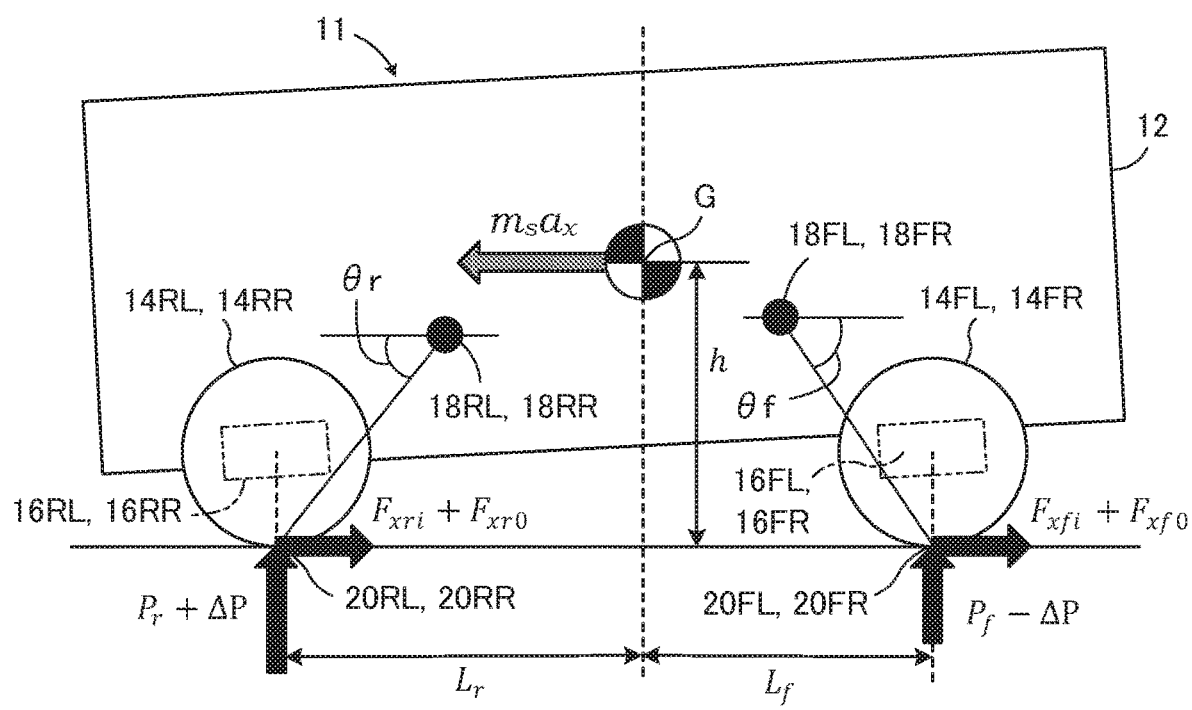
FIG. 9 is an explanatory view of a situation where the vehicle is pitching as viewed from the side of the vehicle.

As shown in FIG. 9, the left front wheel 14FL and the right front wheel 14FR are suspended from the vehicle body 12 by front wheel suspensions 16FL and 16FR, respectively. Similarly, the left rear wheel 14RL and the right rear wheel 14RR are suspended from the vehicle body 12 by rear wheel suspensions 16RL and 16RR, respectively. Instantaneous centers 18FL and 18FR of the left front wheel 14FL and the right front wheel 14FR are located above and to the rear of ground contact points 20FL and 20FR of the left front wheel and the right front wheel, respectively. Thus, the front wheel suspensions 16FL and 16FR have an anti-dive geometry. On the other hand, instantaneous centers 18RL and 18RR of the left rear wheel 14RL and the right rear wheel 14RR are located above and in front of the ground contact points 20RL and 20RR of the left rear wheel and the right rear wheel, respectively. Thus, the rear wheel suspensions 16RL and 16RR have an anti-lift geometry.

Let roll angle of the vehicle body 12 be φ, and let lateral acceleration of the vehicle be $a_y$. The roll angle φ and the lateral acceleration $a_y$ have positive and negative values when the vehicle turns left and right, respectively. Let longitudinal forces of a turning inner front wheel and a turning outer front wheel be $F_{xfi}$ and $F_{xfo}$, and let longitudinal forces of a turning inner rear wheel and a turning outer rear wheel be $F_{xri}$ and $F_{xro}$, respectively. The longitudinal forces $F_{xfi}$, $F_{xfo}$, $F_{xri}$ and $F_{xro}$ have positive values when they are driving forces and negative values when they are braking forces.

Further, as shown in FIG. 9, an angle formed by a line segment connecting the instantaneous centers 18FL and 18FR of the left front wheel and the right front wheel and the ground contact points 20FL and 20FR at the neutral position with respect to the horizontal direction is defined as an angle $\theta_f$. Similarly, an angle formed by a line connecting the instantaneous centers 18RL and 18RR of the left rear wheel and the right rear wheel and the ground contact points 20RL and 20RR with respect to the horizontal direction is defined as an angle $\theta_r$. The left front wheel and the right front wheel rebound in FIG. 9, but the angle $\theta_f$ when the left front wheel and the right front wheel are in their neutral positions is an anti-dive angle. Further, the left rear wheel and the right rear wheel are bound in FIG. 9, but the angle $\theta_r$ when the left rear wheel and the right rear wheel are in their neutral positions is an anti-lift angle.

As understood from the above description, the front wheel suspensions 16FL and 16FR have an anti-dive geometry. Thus, when the longitudinal forces $F_{xfi}$ and $F_{xfo}$ are braking forces, the vehicle body 12 receives upward forces $F_{xfi} \tan \theta_f$ and $F_{xfo} \tan \theta_f$ from the turning inner front wheel and the turning outer front wheel, respectively. When the longitudinal forces $F_{xfi}$ and $F_{xfo}$ are driving forces, the vehicle body 12 receives downward forces $F_{xfi} \tan \theta_f$ and $F_{xfo} \tan \theta_f$ from the turning inner front wheel and the turning outer front wheel, respectively. On the other hand, the rear wheel suspensions 16RL and 16RR have an anti-lift geometry. Thus, when the longitudinal forces $F_{xri}$ and $F_{xro}$ are braking forces, the vehicle body 12 receives downward forces $F_{xri} \tan \theta_r$ and $F_{xro} \tan \theta_r$ from the turning inner rear wheel and the turning outer rear wheel, respectively. When the longitudinal forces $F_{xri}$ and $F_{xro}$ are driving forces, the vehicle body 12 receives upward forces $F_{xri} \tan \theta_r$ and $F_{xro} \tan \theta_r$ from the turning inner rear wheel and the turning outer rear wheel, respectively.

Therefore, the balance of moments in the roll direction of the vehicle body 12 is expressed by the following equation (1).

$$(K_{\varphi f} + K_{\varphi r})\varphi = a_y m_s h_s + (-F_{xii} + F_{xfo})\frac{d}{2}\tan\theta_f + (F_{xri} - F_{xro})\frac{d}{2}\tan\theta_r \quad (1)$$

<Load Moving Amount Between Left and Right Wheels>

Assuming that a load moving amount between the left front wheel 14FL and the right front wheel 14FR is $\Delta W_f$, the balance of moments around the roll center $C_f$ of the vehicle body 12 at the position of the front wheels in the vehicle longitudinal direction is expressed by the following equation (2). Similarly, assuming that a load moving amount between the left rear wheel 14RL and the right rear wheel 14RR is $\Delta W_r$, the balance of moments around the roll center $C_r$ of the vehicle body 12 at the position of the rear wheels in the vehicle longitudinal direction is (3).

$$K_{\varphi f}\varphi = \Delta W_f d - \frac{a_y m_s L_r}{L} h_f + (-F_{xfi} + F_{xfo})\frac{d}{2}\tan\theta_f \quad (2)$$

$$K_{\varphi r}\varphi = \Delta W_r d - \frac{a_y m_s L_f}{L} h_r + (F_{xri} - F_{xro})\frac{d}{2}\tan\theta_r \quad (3)$$

From the above equations (1) and (2), the load moving amount $\Delta W_f$ between the left and right front wheels is expressed by the following equation (4). Similarly, from the above equations (1) and (3), the load moving amount $\Delta W_r$ between the left and right rear wheels is expressed by the following equation (5).

$$\Delta W_f = \frac{a_y m_s}{d}\left[\frac{K_{\varphi f} h_s}{K_{\varphi f} + K_{\varphi r}} + \frac{L_r}{L}h_f\right] + \begin{bmatrix} \frac{1}{2}\frac{K_{\varphi r}}{K_{\varphi f}+K_{\varphi r}}\tan\theta_f \\ -\frac{1}{2}\frac{K_{\varphi r}}{K_{\varphi f}+K_{\varphi r}}\tan\theta_f \\ \frac{1}{2}\frac{K_{\varphi f}}{K_{\varphi f}+K_{\varphi r}}\tan\theta_r \\ -\frac{1}{2}\frac{K_{\varphi f}}{K_{\varphi f}+K_{\varphi r}}\tan\theta_r \end{bmatrix}\begin{bmatrix} F_{xfi} \\ F_{xfo} \\ F_{xri} \\ F_{xro} \end{bmatrix} \quad (4)$$

$$\Delta W_r = \frac{a_y m_s}{d}\left[\frac{K_{\varphi f} h_s}{K_{\varphi f} + K_{\varphi r}} + \frac{L_f}{L}h_r\right] + \begin{bmatrix} \frac{1}{2}\frac{K_{\varphi r}}{K_{\varphi f}+K_{\varphi r}}\tan\theta_f \\ -\frac{1}{2}\frac{K_{\varphi r}}{K_{\varphi f}+K_{\varphi r}}\tan\theta_f \\ \frac{1}{2}\frac{K_{\varphi f}}{K_{\varphi f}+K_{\varphi r}}\tan\theta_r \\ -\frac{1}{2}\frac{K_{\varphi f}}{K_{\varphi f}+K_{\varphi r}}\tan\theta_r \end{bmatrix}\begin{bmatrix} F_{xfi} \\ F_{xfo} \\ F_{xri} \\ F_{xro} \end{bmatrix} \quad (5)$$

<Pitch Moment Balance>

In FIG. 9, a sum of static ground contact loads of the left and right front wheels is represented by Pf, a sum of static ground contact loads of the left and right rear wheels is represented by $P_r$, and a load moving amount between two front wheels and two rear wheels resulting from the longitudinal acceleration $a_x$ of the vehicle 11 is represented by ΔP. The load moving amount ΔP assumes a positive value when the loads move from the front two wheels to the rear two wheels. The balance of moments in the pitch direction of the vehicle body 12 around the center of gravity G is expressed by the following equation (6). The balance of moments in the pitch direction of the vehicle body 12 when the vehicle 11 is in a stationary state is expressed by the following equation (7).

$$L_r(P_r + \Delta P) = L_f(P_f - \Delta P) + h_s(F_{xfi} + F_{xfo} + F_{xri} + F_{xro}) \quad (6)$$

$$P_f L_f = P_r L_r \quad (7)$$

<Load moving amount by braking and driving>

A load moving amount ΔP/2 between the front and rear wheels on the left or right side when the vehicle 11 is braked and driven is expressed by the following equation (8).

$$\frac{1}{2}\Delta P = \frac{1}{2}\frac{h_s}{L}(F_{xfi} + F_{xfo} + F_{xri} + F_{xro}) \qquad (8)$$

<Load Moving Amounts in the Pitch and Roll Directions>

Therefore, a load moving amount in the pitch direction, that is, the load moving amount ΔP between the two front wheels and the two rear wheels is expressed by the following equation (9). A load moving amount in the roll direction, that is, the load moving amount $\Delta W_f$ from the turning inner front wheel to the turning outer front wheel and the load moving amount $\Delta W_r$ from the turning inner rear wheel to the turning outer rear wheel are expressed by the following equations (10) and (11), respectively.

$$\Delta P = \frac{h_s}{L}(F_{xfi} + F_{xfo} + F_{xri} + F_{xro}) \qquad (9)$$

$$\Delta W_f = \frac{a_y m_s}{d}\left[\frac{K_{\varphi f} h_s}{K_{\varphi f} + K_{\varphi r}} + \frac{L_r}{L}h_f\right] + \qquad (10)$$
$$\frac{1}{2}\left[(F_{xfi} - F_{xfo})\frac{K_{\varphi r}}{K_{\varphi f} + K_{\varphi r}}\tan\theta_f + (F_{xri} - F_{xro})\frac{K_{\varphi f}}{K_{\varphi f} + K_{\varphi r}}\tan\theta_r\right]$$

$$\Delta W_r = \frac{a_y m_s}{d}\left[\frac{K_{\varphi r} h_s}{K_{\varphi f} + K_{\varphi r}} + \frac{L_f}{L}h_r\right] - \qquad (11)$$
$$\frac{1}{2}\left[(F_{xfi} - F_{xfo})\frac{K_{\varphi r}}{K_{\varphi f} + K_{\varphi r}}\tan\theta_r + (F_{xri} - F_{xro})\frac{K_{\varphi f}}{K_{\varphi f} + K_{\varphi r}}\tan\theta_r\right]$$

<Load Movement by Applying Braking Force to the Turning Inner Front Wheel>

In a situation where the vehicle is in a non-braking state, longitudinal forces $F_{xfi}$ and $F_{xfo}$ of the left and right front wheels are the same, and longitudinal forces $F_{xri}$ and $F_{xro}$ of the left and right rear wheels are the same, if a braking force is applied to the turning inner front wheel, then $F_{xri}$-$F_{xro}$ remains zero, but $F_{xfi}$-$F_{xfo}$ becomes a negative value. Therefore, a load moving amount $\Delta W_f$ between the left and right front wheels represented by the above equation (10) decreases, so that a load movement from the turning outer front wheel to the turning inner front wheel occurs, a ground contact load of the turning outer front wheel decreases, and a ground contact load of the turning inner front wheel increases. Conversely, a load moving amount $\Delta W_r$ between the left and right rear wheels represented by the above equation (11) increases, so that a load movement from the turning inner rear wheel to the turning outer rear wheel occurs, a ground contact load of the turning inner rear wheel decreases, and a contact load on the turning outer rear wheel increases.

Figure 10:
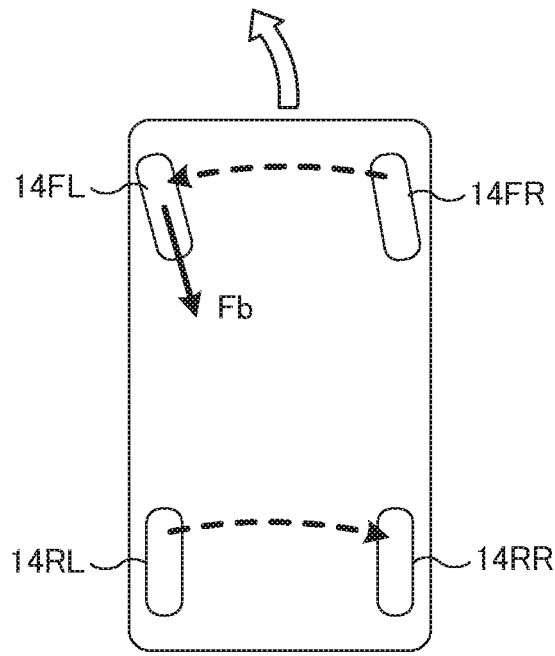
FIG. 10 is a diagram showing a load movement between left and right wheels in a case where a braking force Fb is applied to the left front wheel which is the turning inner front wheel in a situation where the vehicle turns left in a non-braking state.

FIG. 10 shows a load movement between the left and right wheels when a braking force Fb is applied to the left front wheel 14FL that is the turning inner front wheel in a situation where the vehicle 11 turns left in the non-braking state. As shown in FIG. 10, in the front wheels, a load movement from the right front wheel 14FR that is the turning outer front wheel to the left front wheel 14FL that is the turning inner front wheel occurs, and in the rear wheels, a load movement occurs from the left rear wheel 14RL that is the turning inner rear wheel to the right rear wheel 14RR that is the turning outer rear wheel.

<Load Movement by Applying Braking Force to the Turning Inner Rear Wheel>

In a situation where the vehicle is in a non-braking state, longitudinal forces $F_{xfi}$ and $F_{xfo}$ of the left and right front wheels are identical to each other, and longitudinal forces $F_{xri}$ and $F_{xro}$ of the left and right rear wheels are identical to each other, if a braking force is applied to the turning inner rear wheel, then $F_{xfi}$-$F_{xfo}$ remains zero, but $F_{xri}$-$F_{xro}$ assumes a negative value. Therefore, a load moving amount $\Delta W_f$ between the left and right front wheels represented by the above equation (10) decreases, so that a load movement from the turning outer front wheel to the turning inner front wheel occurs, a ground contact load of the turning outer front wheel decreases, and a ground contact load of the turning inner front wheel increases. Conversely, a load moving amount $\Delta W_r$ between the left and right rear wheels represented by the above equation (11) increases, so that a load movement from the turning inner rear wheel to the turning outer rear wheel occurs, a ground contact load of the turning inner rear wheel decreases, and a contact load on the turning outer rear wheel increases.

Figure 11:
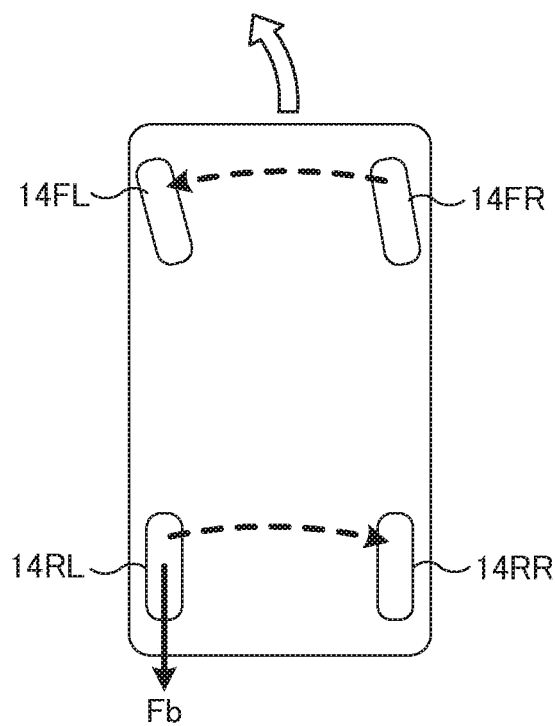
FIG. 11 is a diagram showing a load movement between left and right wheels when a braking force Fb is applied to the left rear wheel which is the turning inner rear wheel in a situation where the vehicle turns left in a non-braking state.

FIG. 11 shows a load movement between the left and right wheels when a braking force Fb is applied to the left rear wheel 14RL which is the turning inner rear wheel in a situation where the vehicle 11 turns left in the non-braking state. As shown in FIG. 11, in the front wheels, a load movement from the right front wheel 14FR that is the turning outer front wheel to the left front wheel 14FL that is the turning inner front wheel occurs, and in the rear wheels, a load movement from the left rear wheel 14RL that is the turning inner rear wheel to the right rear wheel 14RR that is the turning outer rear wheel occurs.

The above-described load movements between the turning inner and outer wheels occur regardless of the turning direction of the vehicle. In addition, when braking forces are applied to the turning outer front wheel and the turning outer rear wheel, load movements in the opposite direction to the above-described load movements occur. That is, a load movement from the turning inner front wheel to the turning outer front wheel and a load movement from the turning outer rear wheel to the turning inner rear wheel occur.

<Reducing a Degree of Understeer by Applying Braking Force>

When turning behavior of the vehicle is understeer, lateral forces of the front wheels, in particular the turning inner front wheel are insufficient compared to required lateral forces. Therefore, by generating a load movement so that a ground contact load of the turning inner front wheel increases, a lateral force of the turning inner front wheel can be increased and a degree of understeer can be reduced.

<A> In a Rear Wheel Drive Vehicle

When the vehicle is a rear wheel drive vehicle, no driving force is applied to the turning inner front wheel because the front wheels are driven wheels. If a longitudinal force is increased by applying a braking force to the turning inner front wheel, a lateral force of the turning inner front wheel may be reduced, and the understeer state may be deteriorated. Therefore, a ground contact load of the turning inner front wheel may be increased by applying a braking force to the turning inner rear wheel.

Notably, the turning inner rear wheel is a driving wheel, so that a driving force is given to the turning inner rear wheel. When a magnitude of the braking force applied to the turning inner rear wheel exceeds twice the driving force applied to the turning inner rear wheel, a magnitude of the longitudinal force of the turning inner rear wheel is increased. Therefore, the magnitude of the braking force applied to the turning inner rear wheel is set so that the lateral force of the turning inner rear wheel is not reduced due to the increase of the longitudinal force of the turning inner rear wheel and the vehicle does not spin. Therefore, the magnitude of the braking force applied to the turning inner rear wheel may be limited to twice or less of the driving force so that a situation does not occur where a lateral force of the turning inner rear wheel decreases and the vehicle becomes in a spin state due to an increase of the longitudinal force of the turning inner rear wheel.

<B> In a Front Wheel Drive Vehicle

When the vehicle is a front wheel drive vehicle, the turning inner rear wheel is a driven wheel, and thus no driving force is applied to the turning inner rear wheel. If the magnitude of the longitudinal force is increased by applying a braking force to the turning inner rear wheel, a lateral force of the turning inner rear wheel may be reduced, and the vehicle may be in a spin state. Therefore, a ground contact load of the turning inner front wheel may be increased by applying a braking force to the turning inner front wheel.

Notably, the turning inner front wheel is a driving wheel, so that a driving force is given to the turning inner front wheel. When a magnitude of the braking force applied to the turning inner front wheel exceeds twice the driving force applied to the turning inner front wheel, the magnitude of the longitudinal force of the turning inner front wheel is increased. Therefore, the magnitude of the braking force applied to the turning inner front wheel may be limited to twice or less of the driving force so that a situation does not occur where the lateral force of the turning inner front wheel is reduced and the understeer state is rather deteriorated due to an increase of the longitudinal force of the turning inner front wheel.

<C> In a Four-Wheel Drive Vehicle

When the vehicle is a four-wheel drive vehicle, all four wheels are driving wheels. Therefore, a ground contact load of the turning inner front wheel may be increased by applying a braking force to at least one of the turning inner front wheel and the turning inner rear wheel.

Notably, for the same reason as in a rear wheel drive vehicle and a front wheel drive vehicle, a braking force applied to at least one of the turning inner front wheel and the turning inner rear wheel may be limited to twice or less the driving force of the wheel.

<Braking Force Applied to the Turning Inner Wheel>

Understeer state caused by a lack of lateral force of the turning inner front wheel is more easily deteriorated as a time change rate of a deviation between a standard yaw rate of the vehicle and an actual yaw rate is high. Therefore, a braking force applied to the turning inner wheel may be controlled based on a time change rate of the yaw rate deviation so as to be higher as the time change rate of the yaw rate deviation is higher.

As described above, when a braking force applied to the turning inner driving wheel becomes excessive and a magnitude of a longitudinal force of the turning inner driving wheel is increased, turning behavior of the vehicle is deteriorated. Therefore, a braking force applied to the turning inner driving wheel may be limited to twice or less the driving force of the turning inner driving wheel.

Embodiments

The present disclosure will now be described in detail with respect to several embodiments with reference to the accompanying drawings.

First Embodiment

Figure 1:
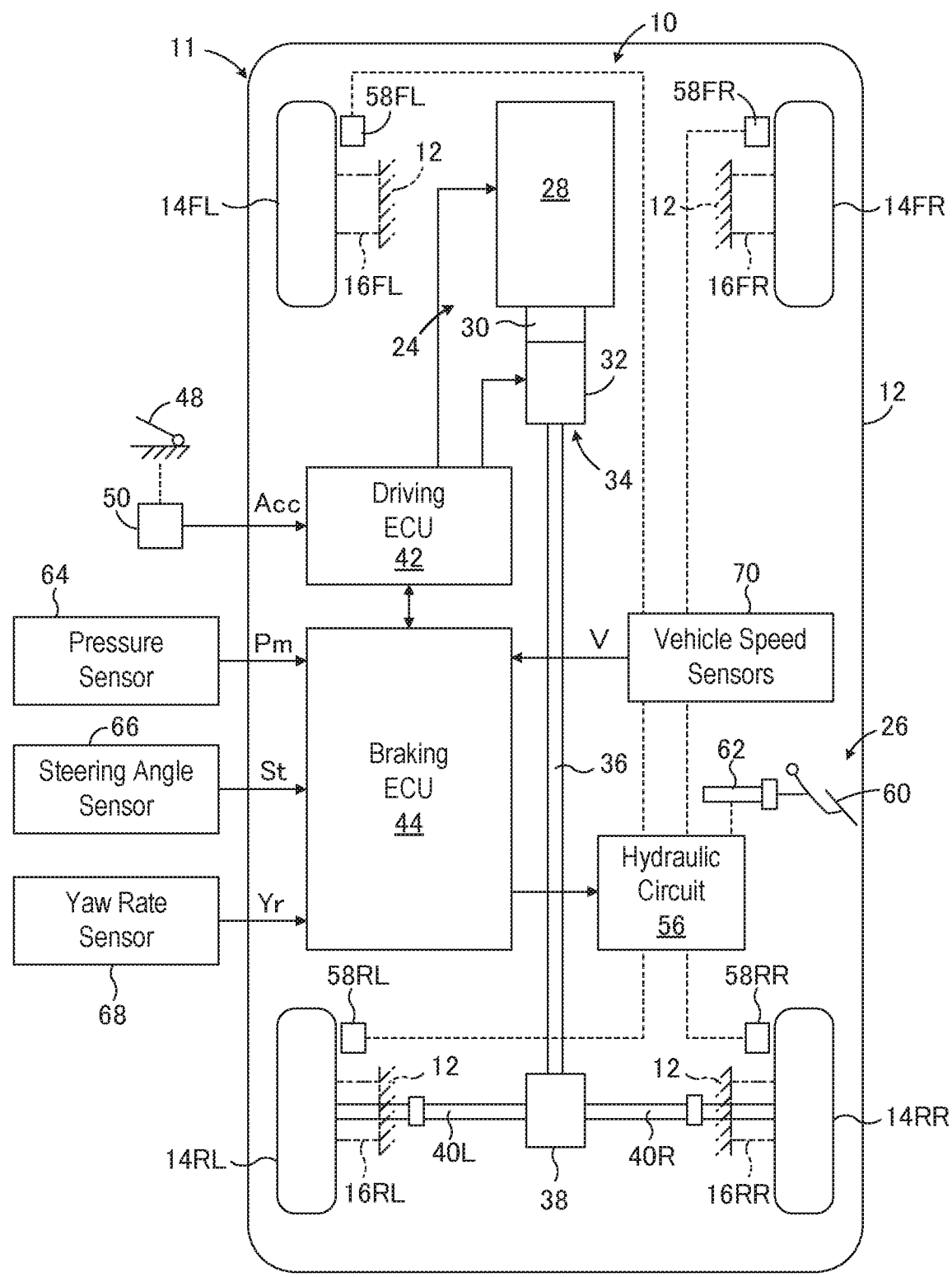
FIG. 1 is a schematic configuration view showing a first embodiment of a turning behavior control apparatus for a vehicle according to the present disclosure applied to a rear wheel drive vehicle.

As shown in FIG. 1, the turning behavior control apparatus 10 according to the first embodiment of the present disclosure is adapted to a vehicle 11 that is a rear wheel drive vehicle. The left and right front wheels 14FL and 14FR suspended from the vehicle body 12 by the front wheel suspensions 16FL and 16FR, respectively, are steered driven wheels. The left and right rear wheels 14RL and 14RR suspended from the vehicle body 12 by the rear wheel suspensions 16RL and 16RR, respectively, are non-steered driving wheels. As mentioned above, the left and right front wheels 14FL and 14FR have anti-dive geometry, and the left and right rear wheels 14RL and 14RR have anti-lift geometry. Although not shown in FIG. 1, the front wheels 14FL and 14FR are steered via tie rods by a rack and pinion type power steering device driven in response to turning operation of a steering wheel by a driver.

The vehicle 11 includes a driving device 24 that generates a driving forces for driving the vehicle, and a braking device 26 that generates braking force applied to the wheels 14FL, 14FR, 14RL and 14RR. The driving device 24 includes an engine 28 and an automatic transmission 34 that includes a torque converter 30 and a geared transmission mechanism 32. An output of the transmission 34 is transmitted to a propeller shaft 36. The driving force of the propeller shaft 36 is transmitted to a left rear wheel axle 40L and a right rear wheel axle 40R by a differential 38, whereby the left and right rear wheels 14RL and 14RR, which are driving wheels, are rotationally driven.

The engine 28 may be either a gasoline engine or a diesel engine, and the transmission may be a CVT (continuously variable transmission). Further, the driving device may be an electric motor, a hybrid system that is a combination of an engine and an electric motor, or a combination of a fuel cell and an electric motor.

A driving force of the vehicle 11 is controlled by controlling the engine 28 and the transmission 34 of the driving device 24 by a driving electronic control unit (hereinafter referred to as "driving ECU") 42 based on a driving, operation amount of the driver. Braking forces of the left and right front wheels 14FL and 14FR and the left and right rear wheels 14RL and 14RR are normally controlled by controlling the braking device 26 by a braking electronic control unit (hereinafter referred to as "braking ECU") 44 based on an amount of braking operation by the driver. Further, a braking force of each wheel is individually controlled by the braking ECU 44 by controlling the braking device 26 regardless of the driver's braking operation as needed.

As shown in FIG. 1, an accelerator opening sensor 50 provided on an accelerator pedal 48 detects an accelerator opening Acc indicating a driver's driving operation amount, and a signal indicating the accelerator opening Acc is input to the driving ECU 42. The driving ECU 42 normally calculates a target driving force Fdt of the vehicle 11 based on an accelerator opening Acc, and controls the engine 28 and the transmission 34 such that the driving force of the vehicle 11 becomes the target driving force Fdt. The driving ECU 42 supplies a signal indicating the target driving force Fdt to the braking ECU 44.

The braking device 26 includes a hydraulic circuit 56, wheel cylinders 58FR, 58FL, 58RR and 58RL provided on the wheels 14FL to 14RL, respectively and a master cylinder 62 that pumps brake oil in response to the driver's depression of a brake pedal 60. Although not shown in detail in FIG. 1, the hydraulic circuit 56 includes a reservoir, an oil pump, various valve devices, etc., and functions as a braking actuator.

The master cylinder 62 is provided with a pressure sensor 64 for detecting a master cylinder pressure Pm, and a signal indicating the master cylinder pressure Pm detected by the pressure sensor 64 is input to the braking ECU 44. The braking ECU 44 controls a braking pressure of each wheel, that is, pressures in the wheel cylinders 58FL to 58RR, based on the master cylinder pressure Pm, whereby controlling a braking force of each wheel according to a depression operation amount of the brake pedal 60, that is, a braking operation amount of the driver. In addition, the braking ECU 44 mutually independently controls the braking forces of the respective wheels as needed regardless of a depression amount of the brake pedal 60, as will be described in detail later.

Although not shown in FIG. 1, a steering shaft integrally connected to the steering wheel, not shown, is provided with a steering angle sensor 66 for detecting a rotation angle of the shaft as a steering angle St. The steering angle sensor 66 sets a steering angle corresponding to the straight traveling of the vehicle 11 as zero, and detects steering angles St in a left turn direction and a right turn direction as a positive value and a negative value, respectively.

The braking ECU 44 receives a signal indicating an actual yaw rate Yr of the vehicle 11 from a yaw rate sensor 68 and receives a signal indicating a vehicle speed V from a vehicle speed sensor 70. Similar to the steering angle sensor 66, the yaw rate sensor 68 sets a yaw rate corresponding to the straight traveling of the vehicle 11 to zero, and detects actual yaw rates Yr in the left turn direction and the right turn direction as a positive value and a negative value, respectively.

The braking ECU 44 calculates a reference yaw rate Yrt of the vehicle 11 in a manner known in the art based on a steering angle St and a vehicle speed V, and calculates a yaw rate deviation $\Delta Yr$ of the vehicle 11 according to the following equation (12). In the following equation (12), signYr is a sign of an actual yaw rate Yr.

$$\Delta Yr = \text{sign}Yr(Yrt-Yr) \quad (12)$$

When the following conditions (A) and (B) are satisfied, the braking ECU 44 applies a braking force to the turning inner rear wheel. The braking force applied to the turning inner rear wheel is variably set according to a time change rate $\Delta Yrd$ of the yaw rate deviation $\Delta Yr$ so as to increase as the time change rate $\Delta Yrd$ increases.
(A) The vehicle 11 is turning without being braked.
(B) The yaw rate deviation $\Delta Yr$ is larger than a deviation reference value $\Delta Yrc$ (a positive constant), and a time change rate $\Delta Yrd$ of the yaw rate deviation $\Delta Yr$ is larger than a start reference value $\Delta Yr1$ (a positive constant).

When the vehicle 11 is in a traveling state other than the above, that is, when at least one of the conditions (A) and (B) is not satisfied, the braking ECU 44 calculates a target yaw moment Myt and a target deceleration Gxt of the vehicle for securing the running stability of the vehicle. Further, the braking ECU 44 calculates target braking forces Fbti (i=fl, fr, rl and rr) of the left and right front wheels and the left and right rear wheels based on the target yaw moment Myt and the target deceleration Gxt, and controls the braking device 26 so that braking forces of the respective wheels become the corresponding target braking forces Fbti.

<Turning Behavior Control Routine>

Figure 2:
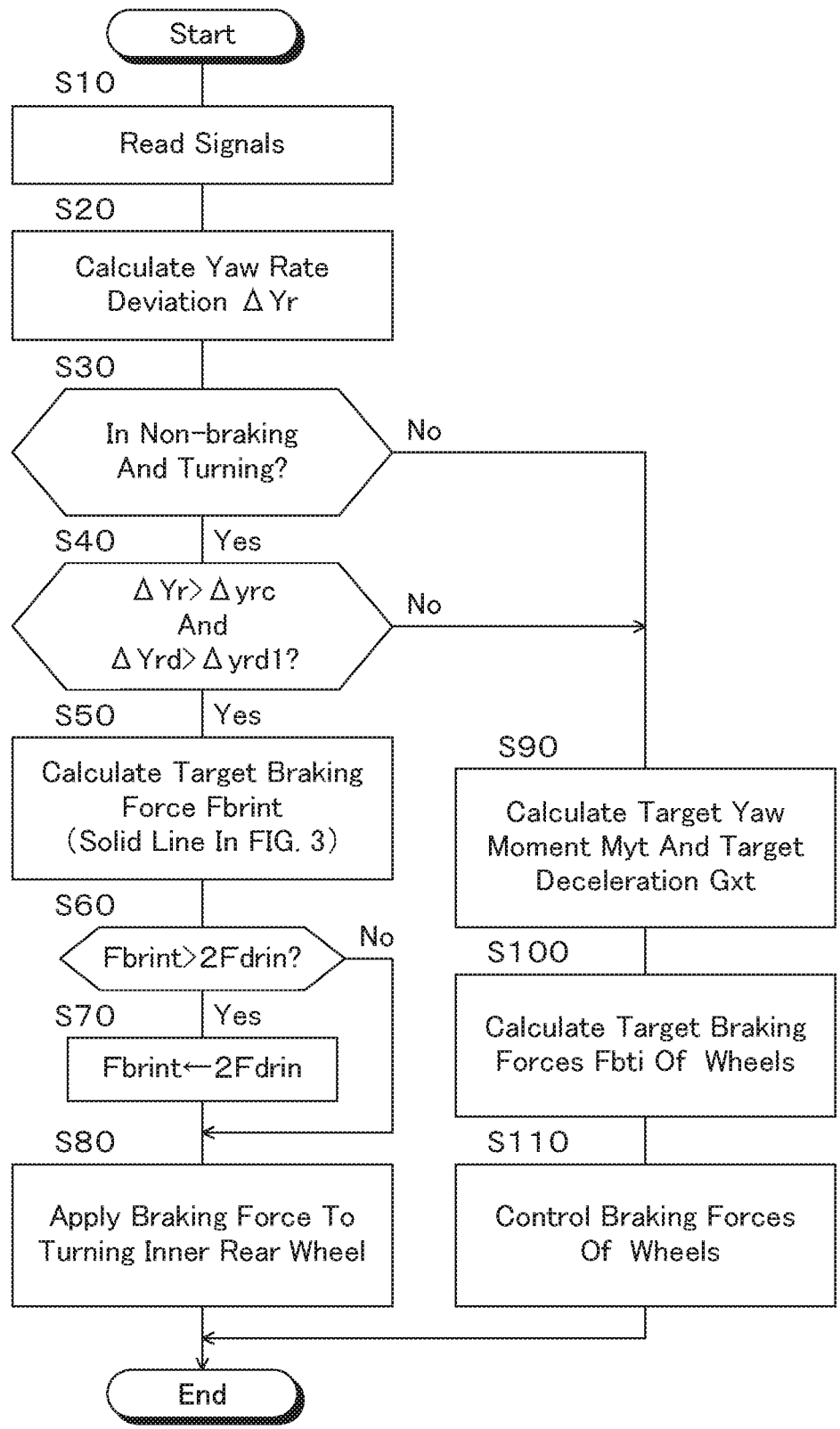
FIG. 2 is a flowchart showing a turning behavior control routine in the first embodiment.

Next, the turning behavior control routine in the first embodiment will be described with reference to the flowchart shown in FIG. 2. The control according to the flowchart shown in FIG. 2 is repeatedly executed by the braking ECU 44 at predetermined time intervals when an ignition switch not shown is ON.

First, in step S10, a signal indicating a steering angle St detected by the steering angle sensor 66 is read. Further, a signal indicating a target driving force Fdt of the vehicle 11 is read from the driving ECU 42.

In step S20, a standard yaw rate Yrt of the vehicle 11 is calculated in a manner known in the art based on the steering angle St and a vehicle speed V, and a yaw rate deviation $\Delta Yr$ of the vehicle 11 is calculated according to the equation (12).

In step S30, a determination is made as to whether or not the vehicle 11 is turning in the non-braking state. When a negative determination is made, the turning behavior control proceeds to step S90, and when an affirmative determination is made, the turning behavior control proceeds to step S40. It should be noted that it may be determined that the vehicle 11 is in the non-braking state when the braking device 26 does not apply any braking force to the wheels, except an application of a braking force to the turning inner rear wheel in step S80 described later. Further, it may be determined that the vehicle 11 is turning when an absolute value of an actual yaw rate Yr is equal to or greater than a reference value Yr0 (a positive constant) for turning determination.

In step S40, a determination is made as to whether or not a yaw rate deviation $\Delta Yr$ is larger than the deviation reference value $\Delta Yrc$ and a time change rate $\Delta Yrd$ of the yaw rate deviation $\Delta Yr$ is larger than the start reference value $\Delta Yrd1$. When a negative determination is made, the turning behavior control proceeds to step S90, and when an affirmative determination is made, the turning behavior control proceeds to step S50. The time change rate $\Delta Yrd$ may be, for example, a time derivative value of a yaw rate deviation $\Delta Yr$.

Figure 3:
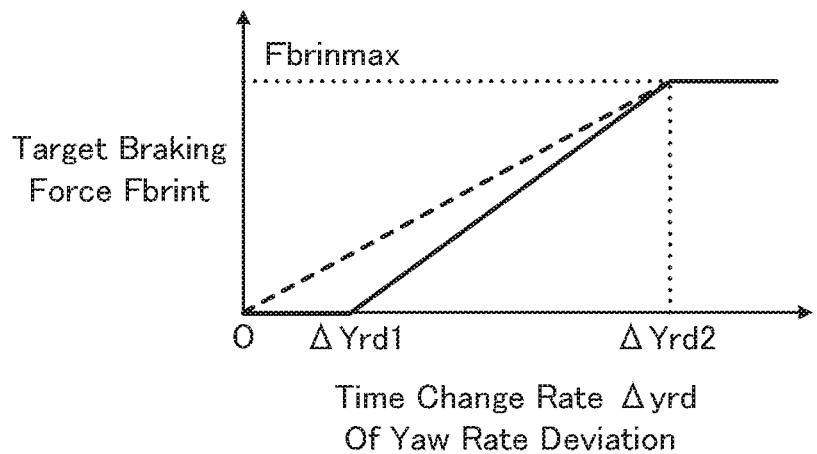
FIG. 3 is a map for calculating a target braking force Fbrint to be applied to a turning inner rear wheel based on a time change rate $\Delta Yrd$ of a yaw rate deviation $\Delta Yr$.

In step S50, a target braking force Fbrint to be applied to the turning inner rear wheel is calculated by referring to the map shown by the solid line in FIG. 3 based on the time change rate $\Delta Yrd$ of the yaw rate deviation $\Delta Yr$. As shown in FIG. 3, the target braking force Fbrint is calculated to be zero when the time change rate $\Delta Yrd$ is less than or equal to a reference value $\Delta Yrd1$ (a positive constant), and is calculated to be the maximum value Fbrinmax (a positive constant) when the time change rate $\Delta Yrd$ is greater than or equal to a reference value $\Delta Yrd2$ (a positive constant larger than $\Delta Yrd1$). Further, the target braking force Fbrint is calculated so that it is larger as the time change rate $\Delta Yrd$ is larger when the time change rate $\Delta Yrd$ is larger than the reference value $\Delta Yrd1$ and smaller than the reference value $\Delta Yrd2$.

In step S60, a driving force Fdrin of the turning inner rear wheel is calculated based on the target driving force Fdt of the vehicle 11, and a determination is made as to whether or not the target braking force Fbrint of the inner rear wheel is greater than twice the driving force Fdrin. That is, a determination is made as to whether or not a longitudinal force of the turning inner rear wheel increases and a lateral force decreases if a braking force based on the target braking force Fbrint is applied to the turning inner rear wheel. When a negative determination is made, the turning behavior control proceeds directly to step S80, and when an affirmative determination is made, the turning behavior control proceeds to step S70.

In step S70, the target braking force Fbrint is corrected to twice the driving force Fdrin of the turning inner rear wheel, and then the turning behavior control proceeds to step S80.

In step S80, the braking device 26 is controlled such that a braking force corresponding to the target braking force Fbrint is applied to the turning inner rear wheel.

In step S90, a target yaw moment Myt and a target deceleration Gxt of the vehicle for ensuring the running stability of the vehicle are calculated based on the yaw rate deviation $\Delta Yr$. The target yaw moment Myt and the target deceleration Gxt may be calculated in any manner known in the art.

In step S100, target braking forces Fbti of the respective wheels are calculated based on the target yaw moment Myt and the target deceleration Gxt, and in step S110, the braking device 26 is controlled such that braking forces of the respective wheels become the corresponding target braking forces Fbti.

<Operation of the First Embodiment>

As understood from the above description, in step S20, a reference yaw rate Yrt of the vehicle 11 is calculated, and a yaw rate deviation $\Delta Yr$ of the vehicle 11 is calculated. In step S30, a determination is made as to whether or not the vehicle 11 is turning in the non-braking state, that is, whether or not the condition (A) is satisfied. Further, in step S40, a determination is made as to whether or not the yaw rate deviation $\Delta Yr$ is larger than the deviation reference value $\Delta Yrc$ and a time change rate $\Delta Yrd$ of the yaw rate deviation $\Delta Yr$ is larger than the start reference value $\Delta Yrd1$, that is, whether or not the above condition (B) is satisfied.

When the above conditions (A) and (B) are satisfied, an affirmative determinations are made in steps S30 and S40, so that steps S50 to S80 are executed. That is, in step S50, a target braking force Fbrint to be applied to the turning inner rear wheel is calculated, and in step S80, a braking force corresponding to the target braking force Fbrint is applied to the turning inner rear wheel so that a time change rate $\Delta Yrd$ of the yaw rate deviation $\Delta Yr$ increases.

As a result, as described above, a load movement from the turning outer front wheel to the turning inner front wheel occurs, and a lateral load of the turning inner front wheel is increased by an increase in a ground contact load of the turning inner front wheel. Therefore, a turning yaw moment acting on the vehicle 11 is increased, so that a degree of deterioration of the understeer state and a degree of the understeer can be reduced.

Figure 4:
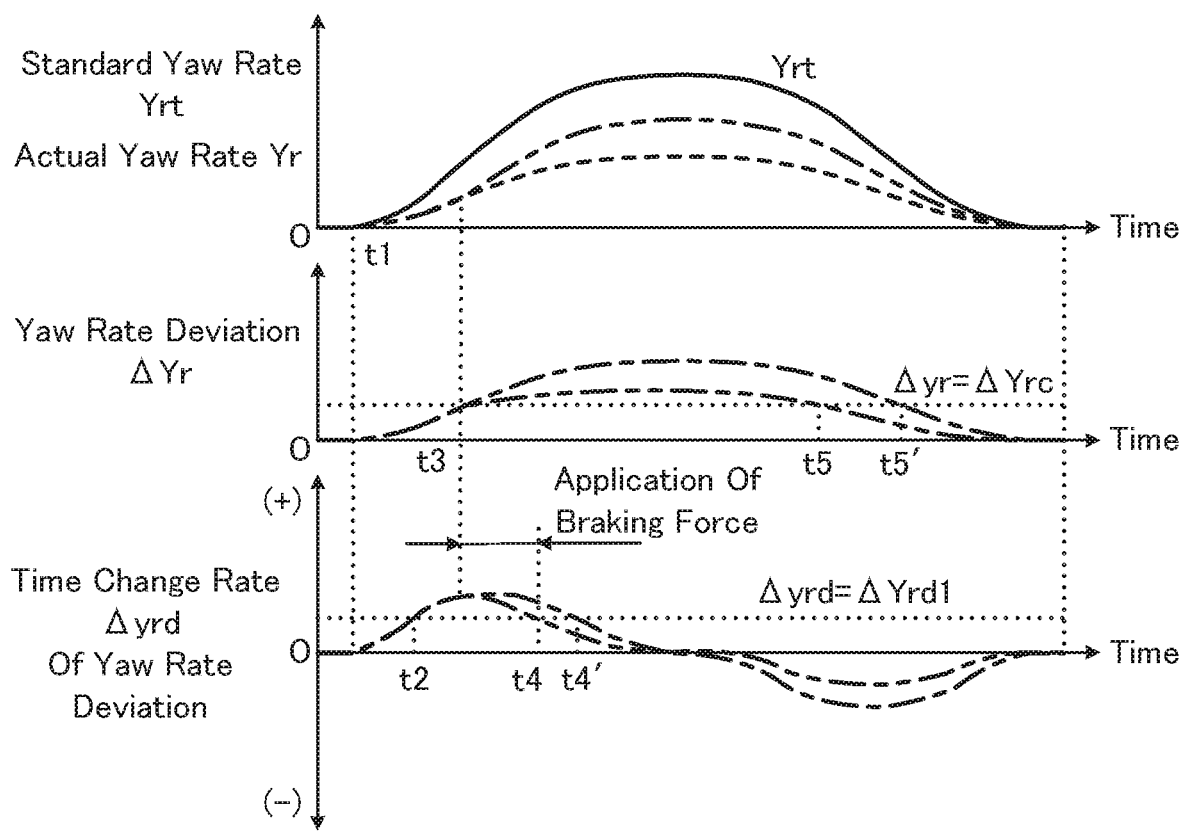
FIG. 4 is a view showing an example of the operation of the first embodiment in a case where the vehicle is in understeer state in a situation where the vehicle turns without being braked and a standard yaw rate Yrt of the vehicle increases and then decreases.

For example, FIG. 4 is a diagram showing an example of the operation of the first embodiment in the case where the vehicle 11 becomes in understeer state in a situation where the vehicle turns without braking and a reference yaw rate Yrt of the vehicle increases and then decreases. It is to be noted that in FIG. 4, the one-dot chain line and the two-dot chain line indicate changes in an actual yaw rate Yr of the vehicle and the like for the case where a braking force is not applied to the turning inner rear wheel according to the first embodiment (in a conventional case) and the case where a braking force is applied to the turning inner rear wheel according to the first embodiment.

As shown in FIG. 4, it is assumed that the reference yaw rate Yrt starts to increase at time point t1, and the time change rate $\Delta Yrd$ of the yaw rate deviation $\Delta Yr$ becomes larger than the start reference value $\Delta Yrd1$ at time point t2. Further, it is assumed that at time point t3, the yaw rate deviation $\Delta Yr$ becomes larger than the deviation reference value $\Delta Yrc$, and the above condition (B) is satisfied.

At time point t3, application of a braking force corresponding to the target braking force Fbrint to the turning inner rear wheel is started, so that after time point t3, the actual yaw rate Yr of the vehicle becomes closer to the standard yaw rate Yrt than in the conventional case. Therefore, the yaw rate deviation $\Delta Yr$ after time point t3 is smaller than in the conventional case, and the degree of deterioration of the understeer state of the vehicle 11 and the degree of the understeer are reduced.

Further, since the yaw rate deviation $\Delta Yr$ becomes smaller than that in the conventional case, assuming that the yaw rate deviation $\Delta Yr$ becomes smaller than the reference value $\Delta Yrc$ at time point t5, which is earlier than the similar time point t5' in the conventional case. In other words, the understeer condition of the vehicle 11 is eliminated earlier than in the conventional case.

Further, a magnitude of the time change rate $\Delta Yrd$ of the yaw rate deviation $\Delta Yr$ is smaller than in the conventional case. Therefore, assuming that the time change rate $\Delta Yrd$ of the yaw rate deviation $\Delta Yr$ becomes smaller than the start reference value $\Delta Yrd1$ at time point t4, which is earlier than the same time point t4' in the conventional case.

In particular, according to the first embodiment, when the target braking force Fbrint is larger than twice the driving force Fdrin of the turning inner rear wheel, an affirmative determination is made in step S60, and in step S70, the target braking force Fbrint is corrected to twice the driving force Fdrin of the turning inner rear wheel. Therefore, when the target braking force Fbrint is larger than twice the driving force Fdrin of the turning inner rear wheel, a braking force larger than the driving force Fdrin can be prevented from being applied to the turning inner rear wheel. Therefore, it is possible to prevent the vehicle from being in spin state due to an increase in the longitudinal force of the turning inner rear wheel and a decrease in the lateral force.

If at least one of the conditions (A) and (B) is not satisfied, a negative determination is made in step S30 or S40, so that steps S90 to S110 are executed. That is, in step S90, a target yaw moment Myt and a target deceleration Gxt of the vehicle for ensuring the running stability of the vehicle are calculated, and in steps S100 and S110, braking forces of the respective wheels are controlled such that the target yaw moment Myt and the target deceleration Gxt are achieved. Therefore, the turning behavior of the vehicle 11 can be stabilized when the vehicle becomes in understeer or in oversteer.

Second Embodiment

Figure 5:
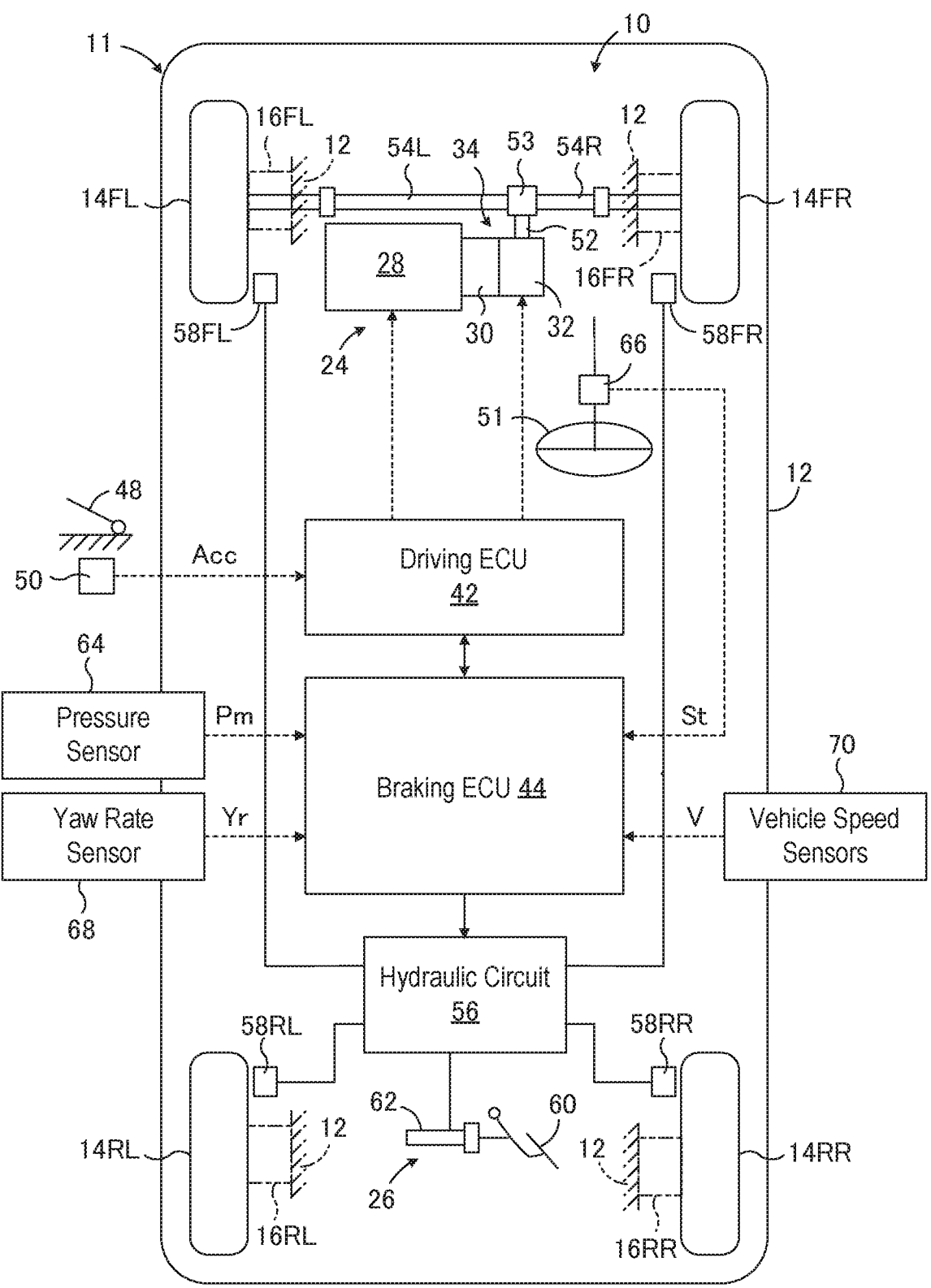
FIG. 5 is a schematic configuration view showing a second embodiment of the turning behavior control apparatus for a vehicle according to the present disclosure applied to a front wheel drive vehicle.

FIG. 5 is a schematic configuration view showing a second embodiment of the turning behavior control apparatus for a vehicle according to the present disclosure applied to a front wheel drive vehicle. In FIG. 5, the same members as the members shown in FIG. 1 are given the same reference numerals as the reference numerals in FIG. 1. Further, in FIG. 5, a steering wheel 51 not shown in FIG. 1 is shown.

In the second embodiment, the vehicle 11 is a front wheel drive vehicle. Therefore, a driving force of engine 28 is transmitted to an output shaft 52 through the torque converter 30 and the transmission 32, and further transmitted to drive shafts 54L and 54R via a front wheel differential 53, whereby left and right front wheels 14FL and 14FR are driven to rotate. The left and right front wheels 14FL and 14FR are steered by a steering device (not shown) which is driven in response to the rotation operation of the steering wheel 51 by a driver. Therefore, the left and right front wheels 14FL and 14FR are steered driving wheels. On the other hand, the left and right rear wheels 14RL and 14RR are non-steered driven wheels.

When the vehicle 11 is turning without being braked and a yaw rate deviation $\Delta Yr$ is larger than the deviation reference value ΔYrc and a time change rate ΔYrd of the yaw rate deviation ΔYr is larger than the start reference value ΔYrd1, the braking ECU 44 applies a braking force to the turning inner front wheel. The braking force applied to the turning inner front wheel is variably set according to a time change rate ΔYrd of the yaw rate deviation so as to increase as the time change rate ΔYrd increases.

When the vehicle 11 is in the traveling state other than the above, the braking ECU 44 calculates a target yaw moment Myt and a target deceleration Gxt of the vehicle to secure the running stability of the vehicle, as in the first embodiment and based on these, calculates target braking forces Fbti (i=fl, fr, rl and rr) of the left and right front wheels and the left and right rear wheels. Further, the braking ECU 44 controls the braking device 26 so that braking forces of the respective wheels become the corresponding target braking forces Fbti.

<Turning Behavior Control Routine>

Next, the turning behavior control routine in the second embodiment will be described with reference to the flowchart shown in FIG. 6. The control according to the flowchart shown in FIG. 6 is also repeatedly executed at predetermined time intervals by the braking ECU 44 when an ignition switch not shown is ON.

Figure 6:
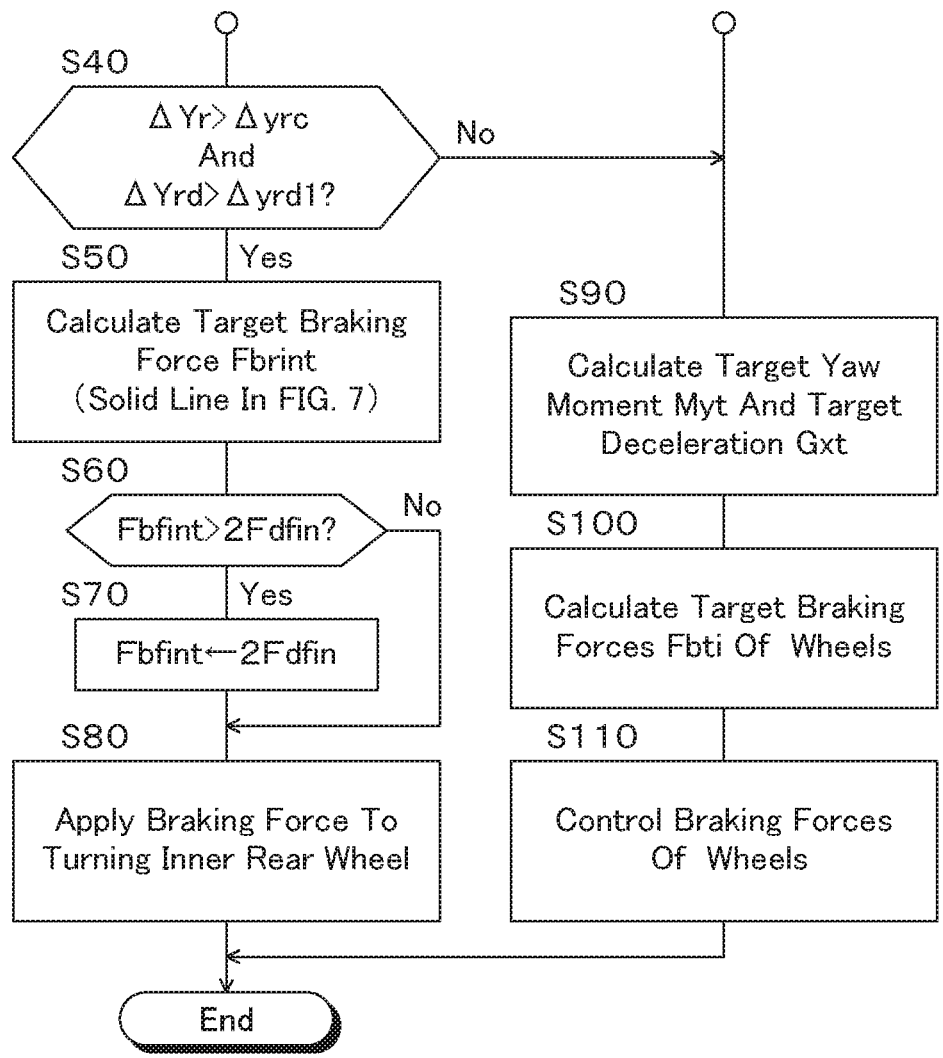
FIG. 6 is a flowchart showing the main part of a turning behavior control routine in the second embodiment.

As can be seen from comparing FIG. 6 with FIG. 2, steps S10-S40 and steps S90-S110 are respectively carried out in the same manners as the corresponding steps in the first embodiment.

Figure 7:
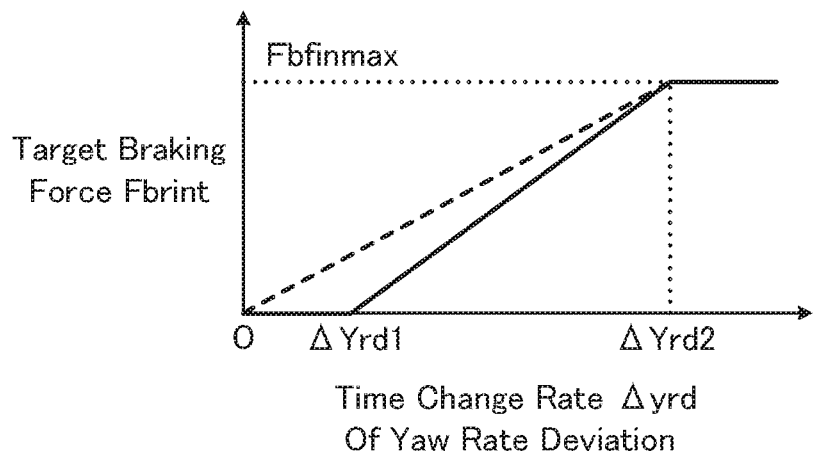
FIG. 7 is a map for calculating a target braking force Fbfint to be applied to the turning inner front wheel based on a time change rate $\Delta Yrd$ of a yaw rate deviation $\Delta Yr$.

In step S50, a target braking force Fbfint to be applied to the turning inner front wheel is calculated by referring to the map shown by the solid line in FIG. 7 based on a time change rate ΔYrd of the yaw rate deviation ΔYr. As shown in FIG. 7, the target braking force Fbfint is calculated to be zero when the time change rate ΔYrd is less than or equal to the reference value ΔYrd1, and to be the maximum value Fbfinmax (a positive constant) when the time change rate ΔYrd is greater than or equal to the reference value ΔYrd2. Further, the target braking force Fbfint is calculated so that it becomes larger as the time change rate ΔYrd is larger when the time change rate ΔYrd is larger than the reference value ΔYrd1 and smaller than the reference value ΔYrd2.

In step S60, a driving force Fdfin of the turning inner front wheel is calculated based on a target driving force Fdt of the vehicle 11, and, a determination is made as to whether or not the target braking force Fbfint is larger than twice the driving force Fdfin of the turning inner front wheel. That is, a determination is made as to whether or not a longitudinal force of the turning inner front wheel increases and a lateral force decreases when a braking force based on the target braking force Fbfint is applied to the turning inner front wheel. When a negative determination is made, the turning behavior control proceeds directly to step S80, and when an affirmative determination is made, the turning behavior control proceeds to step S70.

In step S70, the target braking force Fbfint is corrected to twice the driving force Fdfin of the turning inner front wheel, and then the turning behavior control proceeds to step S80.

In step S80, the braking device 26 is controlled such that a braking force corresponding to the target braking force Fbfint is applied to the turning inner front wheel.

As understood from the above description, according to the second embodiment, when the above conditions (A) and (B) are satisfied, an affirmative determinations are made in steps S30 and S40, so that steps S50 to S80 are executed. That is, in step S50, a target braking force Fbfint to be applied to the turning inner front wheel is calculated so that it becomes larger as the time change rate ΔYrd of a yaw rate deviation ΔYr is larger, and in step S80, a braking force corresponding to the target braking force Fbfint is applied to the turning inner front wheel.

As a result, as described above, a load movement from the turning outer front wheel to the turning inner front wheel occurs, and a lateral load of the turning inner front wheel is increased by an increase in a ground contact load of the turning inner front wheel. Therefore, as in the first embodiment, a turning yaw moment acting on the vehicle 11 is increased, so that the degree of deterioration of the understeer state and the degree of the understeer can be reduced.

In particular, according to the second embodiment, when a target braking force Fbfint is larger than twice a driving force Fdfin of the turning inner front wheel, an affirmative determination is made in step S60, and in step S70, the target braking force Fbfint is corrected to twice the driving force Fdfin of the turning inner front wheel. Consequently, when the target braking force Fbfint is larger than twice the driving force Fdfin of the turning inner front wheel, a braking force larger than the driving force Fdrin can be prevented from being applied to the turning inner front wheel. Therefore, it is possible to prevent the understeer state of the vehicle from being further deteriorated due to an increase in the longitudinal force of the turning inner front wheel and a decrease in the lateral force.

Notably, according to the first and second embodiments, target braking forces Fbrint and Fbfint are calculated so as to increase as the time change rate ΔYrd of a yaw rate deviation ΔYr increases. Thus, a braking force applied to the turning inner wheel increases as a time change rate ΔYrd of a yaw rate deviation ΔYr increases, in other words, as a degree of deterioration of understeer state of the vehicle 11 increases. Therefore, for example, a degree of deterioration of understeer state and a degree of understeer state can be effectively and appropriately reduced as compared to where a braking force applied to the turning inner wheel is constant regardless of a time change rate ΔYrd of a yaw rate deviation ΔYr.

Further, according to the first and second embodiments, even if a yaw rate deviation ΔYr is larger than the deviation reference value ΔYrc, when a time change rate ΔYrd of a yaw rate deviation ΔYr becomes smaller than the reference value ΔYrd1 (end reference value), the application of a braking force to a turning inner wheel is terminated. Therefore, it is possible to effectively prevent a braking force from being applied to a turning inner wheel for an excessively long time and effectively prevent the turning behavior of the vehicle 11 from being deteriorated due to the application of the braking force to the turning inner wheel for an excessively long time.

In the first and second embodiments, when a time change rate ΔYrd of a yaw rate deviation ΔYr becomes smaller than the reference value ΔYrd1 (end reference value), a negative determination is made in step S40, and steps S90 to S110 are executed. Therefore, braking forces of the respective wheels are controlled to achieve a target yaw moment Myt and a target deceleration Gxt of the vehicle for securing the running stability of the vehicle, so that understeer state of the vehicle is reduced and stable turning behavior of the vehicle is secured.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described first embodiment, the vehicle 11 is a rear wheel drive vehicle and in the second embodiment, the vehicle 11 is a front wheel drive vehicle, but the turning behavior control apparatus of the present disclosure may be applied to a four-wheel drive vehicle. In that case, a braking force based on a time change rate ΔYrd of a yaw rate deviation ΔYr may be applied to a turning inner front wheel or a turning inner rear wheel, and may be applied to both the turning inner front wheel and the turning inner rear wheel.

Further, in the first and second embodiments, the reference values for determining a time change rate ΔYrd of a yaw rate deviation ΔYr, that is, a start reference value ΔYrds for determining an application start of a braking force and an end reference value ΔYrde for determining an application end of a braking force are the same ΔYrd1. However, these reference values may be different from one another, in which case an end reference value ΔYrde may be smaller than a start reference value ΔYrds.

Further, in the first and second embodiments, the target braking forces Fbrint and Fbfint are calculated based on a time change rate ΔYrd of a yaw rate deviation. However, the target braking forces Fbrint and Fbfint may be calculated based on a time change rate of a yaw rate deviation ΔYrd and a vehicle speed V so as to increase as the vehicle speed. V increases.

Further, in the first and second embodiments, target braking forces Fbrint and Fbfint are zero when a time change rate of a yaw rate deviation ΔYrd is less than or equal to the reference value ΔYrd1. However, target braking forces Fbrint and Fbfint may be positive values when a time change rate ΔYrd is less than or equal to reference value ΔYrd1, for example, as shown by dashed lines in FIGS. 3 and 7.

Further, in the first and second embodiments, in step S70, target braking forces Fbrint and. Fbfint are corrected to twice the values of driving forces Fdrin and Fdfin of the corresponding turning inner wheels, respectively. However, target braking forces Fbrint and Fbfint may be corrected to values smaller than twice the driving forces Fdrin and Fdfin of the corresponding turning inner wheels, respectively. In other words, when the target braking forces Fbrint and Fbfint are larger than twice the driving forces Fdrin and Fdfin of the corresponding turning inner wheels, respectively, the target values may be corrected to values less than twice the driving forces Fdrin and Fdfin. When the vehicle is a four-wheel drive vehicle and target braking forces Fbrint and/or Fbfint are greater than twice driving force Fdrin and/or Fdfin of the corresponding turning inner wheels, respectively, the driving forces Fdrin and/or Fdfin may be corrected to values or a value equal to or less than twice the corresponding driving forces.

Further, in the first and second embodiments, when at least one of the conditions (A) and (B) is not satisfied, steps. S90 to S110 are executed. That is, a target yaw moment Myt and a target deceleration Gxt of the vehicle are calculated to ensure the running stability of the vehicle, and braking forces of the respective wheels are controlled so that the target yaw moment Myt and the target deceleration Gxt are achieved. However, turning behavior control performed when at least one of the conditions (A) and (B) is not satisfied may be any turning behavior control known in the art.

What is claimed is:

1. A behavior control apparatus for a vehicle that is applied to a vehicle which comprises front wheel, suspensions and rear wheel suspensions having anti-dive and anti-lift geometries, respectively, and a braking device configured to independently apply braking forces to left and right front wheels and left and right rear wheels, and the left and right front wheels are steered wheels, wherein
the behavior control apparatus comprises a control unit for controlling the braking device, and the control unit is configured to control the braking device to apply a braking force to a turning inner driving wheel when a deviation between a standard yaw rate of the vehicle and an actual yaw rate exceeds a deviation reference value and a time change rate of the deviation exceeds a start reference value in a situation where the vehicle is turning without braking.

2. The behavior control apparatus for a vehicle according to claim 1, wherein the control unit is configured to calculate a target value of the braking force to be applied to the turning inner driving wheel based on at least the time change rate of the deviation so as to increase as the time change rate of the deviation increases and control the braking device such that a braking force applied to the turning inner driving wheel becomes the target value.

3. The behavior control apparatus for a vehicle according to claim 1, wherein the control unit is configured to correct a magnitude of the target value to be equal to or less than twice a driving force of the turning inner driving wheel when the magnitude of the target value exceeds twice the driving force of the turning inner driving wheel.

4. The behavior control apparatus for a vehicle according to claim 1, wherein the control unit is configured to end the application of the braking force to the turning inner driving wheel when the time change rate of the deviation becomes less than an end reference value even if the deviation exceeds the deviation reference value.

* * * * *